April 27, 1926.

K. H. P. WELSCH 1,582,361

BEARING FOR THE BLADES OF WIND OR WATER WHEELS

Filed June 22, 1925

Inventor
K. H. P. Welsch
by Langner, Parry, Card + Langner
Att'ys

Patented Apr. 27, 1926.

1,582,361

UNITED STATES PATENT OFFICE.

KARL HERMANN PAUL WELSCH, OF HAMBURG, GERMANY.

BEARING FOR THE BLADES OF WIND OR WATER WHEELS.

Application filed June 22, 1925. Serial No. 38,873.

*To all whom it may concern:*

Be it known that I, KARL HERMANN PAUL WELSCH, citizen of Germany, residing at Hamburg, Germany, have invented certain new and useful Improvements in Bearings for the Blades of Wind or Water Wheels, of which the following is a specification.

The heretofore known wind or water wheels, the blades of which are arranged parallel to the axis of the wheel, particularly used as wind motors in horizontal position, make use of the power of the wind or stream of water with fair efficiency. The present invention has the object to take even still better advantage of such power than it was possible heretofore. With this object in view the shafts to which the blades or wings are attached, are given such a bearing, that a comparatively large component of the power or force acts in a direction tangential to the rim of the wheel. This result is secured by journaling the shafts of the blades rotatably to a limited extent at the ends of the arms, which with their other ends are pivoted to the rim of the wheel, whereby the known locking discs are adapted to give way together with the arms similarly to a knee-lever or toggle joint. The locking discs engage in this case the known latch in such manner that both parts can move longitudinally to one another as well as rotatably. If found more convenient the latch may be provided with a friction roll engaging a slot in the locking disc, the walls of the slot running parallel to one another.

In the drawing in Fig. 1 the central part of a shaft of blades is shown in elevation, the upper and lower parts being broken off together with the blades and the rim of the blades being shown in section.

Figure 1:
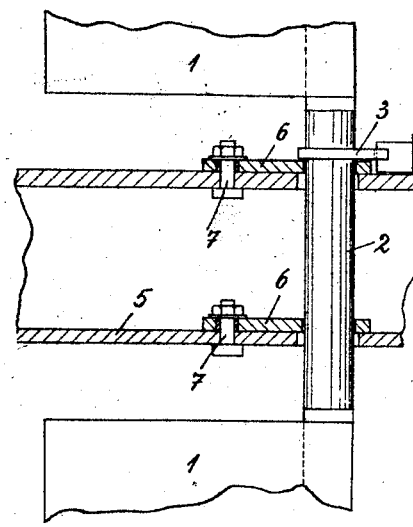

To the shaft 2 carrying the blades 1 a locking disc 3 of known construction is attached, which is adapted to be locked by a longitudinal movable latch 4. Instead of being journaled directly to the rim 5 of the wheel the shafts 2 are journaled to special arms 6 which are pivotally attached by bolts 7 to the rim 5 of the wheel. These shafts 2 are movably received in slots 5' in rim 5 and in operation, move in the slots as shown in Figs. 2-5. By the influence of the wind or water power the blades 1 if yielding are bent from the position shown in Fig. 2 to the position shown in Fig. 3, and at the same time the shaft 2 moves in slot 5' in such a manner, as to bear against an edge of the slot and thus, by the effect of the power a tensile strain will be exerted on the arms 6. In the construction shown the discs 3 are circular. For the exertion or transmission of the power this shape is of no importance, however, the round shape has the object to enable the disc to support the latch 4 on its circumference, after the latch is retracted for releasing the blade and before in known manner it can snap into the groove 8 of the disc 3 under the action of the spring.

Figure 2:
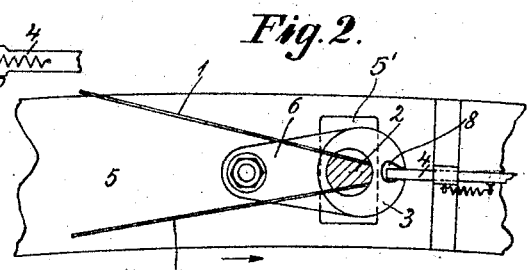
Figs. 2 and 3 are plan views of elastic or yielding blades in two different positions.
Figure 3:
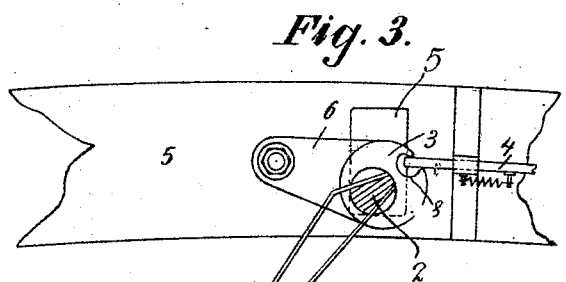

Care is to be taken not to allow the latch 4 to project into the disc in such manner as to prevent rotation of this disc. In the construction shown in Figs. 2 and 3 this is brought about by giving the walls of the groove 8 a suitable shape as shown in Figs. 2 and 3, while according to the construction shown in Figs. 4 and 5 the latch is provided with an anti-friction roller 9, the groove having parallel walls.

Figure 4:
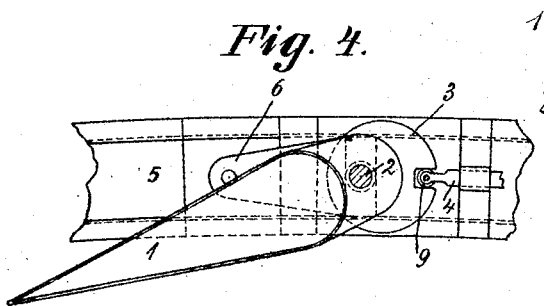
Figs. 4 and 5 are similar views as those shown in Figs. 2 and 3, the blades being made of stiff material.
Figure 5:
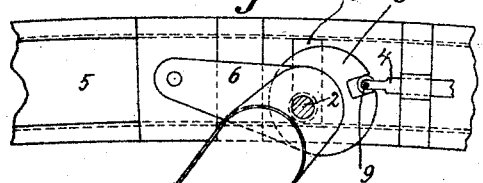

Even in the construction shown in Figs. 4 and 5 in which the blades 1 are not elastic or yielding in themselves, a tensile force will act on the arm 6, the component of which, directed tangentially to the rim of the wheel, will be large, so that the greatest possible efficiency of the wheel is secured.

I claim:

1. A bearing for the shafts of the blades of a wind or a water wheel having its blades parallel to the axis of the wheel, comprising, a wheel rim, an arm pivoted to the rim, a blade shaft journalled in the free end of the arm, a locking member on the shaft, a latch for cooperating with the locking member, the arm and locking member being movable as a toggle joint when the locking member is engaged by the latch.

2. A bearing for the shafts of the blades of a wind or a water wheel having its blades parallel to the axis of the wheel, comprising, a wheel rim, an arm pivoted to the rim, a blade shaft journalled in the free end of the arm, a locking member on the shaft, a latch for cooperating with the locking member, the arm and locking member being movable as a toggle joint when the locking member is engaged by the latch, the latch, when in engagement with the locking member, operating to hold the locking member against bodily rotary and sliding movement.

3. A bearing for the shafts of the blades of a wind or a water wheel having its blades parallel to the axis of the wheel, comprising, a wheel rim, an arm pivoted to the rim, a blade shaft journalled in the free end of the arm, a locking member on the shaft, a latch for cooperating with the locking member, the arm and locking member being movable as a toggle joint when the locking member is engaged by the latch, the latch, when in engagement with the locking member, operating to hold the locking member against bodily rotary and sliding movement, a parallel sided slot in the locking member and an anti-friction roller on the latch and engageable in the slot.

In testimony whereof I have signed my name to this specification.

KARL HERMANN PAUL WELSCH.